Patented July 6, 1954

2,683,081

UNITED STATES PATENT OFFICE 2,683,081

STABILIZED ORGANIC COMPOSITIONS

Eugene F. Hill, Detroit, and David O. De Pree, Birmingham, Mich., assignors to Ethyl Corporation, New York, N. Y., a corporation of Delaware No Drawing. Application December 9, 1950, Serial No. 200,115

15 Claims. (Cl. 44—71)

This invention relates to the stabilization of petroleum hydrocarbons. More particularly, our invention relates to inhibition of attack by oxygen, and the prolongation of the useful life of petroleum hydrocarbons. This application is a continuation-in-part of applicants' co-pending application, S. N. 135,043, filed December 24, 1949, now abandoned.

Petroleum hydrocarbons comprise a broad field of industrially valuable materials. Among the more important uses are included motor fuels, heating fuels, lubricants, solvents, and chemical intermediates. In all these fields the problem of protecting such materials from attack by oxygen during separation, manufacture, compounding, blending, storage and use is important and in many instances is essential for successful utilization of these products. The provision of materials which will furnish such protection has long been recognized as an urgent need.

Hydrocarbon fuels for use in internal combustion, spark ignition engines may be classified broadly into two categories: those manufactured and marketed primarily for use in automotive engines, and those manufactured and marketed for use in aircraft engines. Although each type of fuel is composed essentially of hydrocarbons, the type and stability characteristics of the hydrocarbons comprising each differ considerably. For example, typical automotive fuels contain straight and branched chain aliphatics, olefins, naphthenes and some aromatics, while typical aircraft fuels are particularly low in olefins. During the refining, manufacturing and blending processes and during subsequent storage and handling operations it is unavoidable that these fuels or their ingredients, such as cracked blending stocks, are brought into contact with oxygen. The result of such contact is the formation, by oxidation or polymerization or a combination thereof, of gummy materials which interfere with the efficient utilization of said fuels in the engine. Automotive gasolines are, in general, more susceptible to this type of degradation by oxygen than aircraft fuels.

Both automotive and aircraft fuels are commonly blended with tetraethyllead before use. Such blending imposes a further point of instability in the finished fuel, since the tetraethyllead is susceptible to some deterioration by contact with oxygen during the blending, storage and handling operations, with consequent formation of haze, loss of some antiknock value, and lessened performance in the engine. This point of attack is often overlooked, and is ordinarily unimportant in automotive fuels, as the protective measures necessary for the base stock are usually more than sufficient to protect the tetraethyllead. If, however, a stabilizing ingredient were added which is capable of protecting only the fuel, the attack upon the tetraethyllead would then become apparent. In aircraft fuels the protection ordinarily must center upon the antiknock additive, as the fuel itself is relatively stable. Furthermore, this phase of the problem becomes relatively more important in aircraft fuels, since the tetraethyllead content of such fuels is generally several times that present in automotive fuels.

In recent years a similar problem of degradation of fuels for use in compression ignition engines has become prominent. As the percentage of cracked stock in such fuels increases, resulting in a higher olefin content, the susceptibility to gum formation by exposure to oxygen increases, by processes of oxidation and polymerization, or a combination thereof, of these unstable hydrocarbon components. The presence of such gummy materials interferes with the normal operation of the fuel filters and injectors in compression ignition engines, thus lowering the efficiency of the engine.

Heretofore, it has not been possible to protect fuels for internal combustion engines effectively by means of a single class of substances against the two above-described separate but related deleterious effects of contact with oxygen during the refining, manufacturing, blending, storage and handling operations. Furthermore, because of the specifications imposed on fuels by the rigid requirements of present day engines, particularly aircraft engines, it is essential that any material capable of protecting such fuels against deterioration be effective in extremely small quantities, on the order of one pound of additive per five thousand gallons of fuel, so that secondary problems do not arise through their use.

Hydrocarbons for other purposes than motor fuels likewise require protection from oxidative degradation. For example, lubricating oils, particularly those containing chemical unsaturation or a high proportion of chemical additives are of greatly diminished utility when oxygen attack occurs, both as regards stability during use, and stability on storage prior to use. Hydrocarbon solvents, of an unsaturated character, are a further example of the general problem encountered with utilization of petroleum hydrocarbons referred to herein. Furthermore, the tremendous growth of that branch of industrial chemicals based on petroleum hydrocarbons, through cracking, polymerization, condensation, reforming and other synthetic operations has created a need for substances which will protect such raw materials prior to and during the synthetic operations to which they are submitted. Recently, heating fuels of liquid hydrocarbon type have required protection from gum-forming degradation to promote trouble-free operation of the heating devices.

It is a primary object of our invention to provide a class of compounds which possesses the ability of inhibiting deterioration of organic substances comprising hydrocarbons in the presence of oxygen. A further object of our invention is to retard the deterioration of such organic substances which normally are susceptible to attack by oxygen or ozone, and which thereby lose the utility in the service for which they are manufactured, compounded or employed. A more particular object is to render hydrocarbons and hydrocarbon compositions stable on prolonged storage or during manufacture or use in the presence of oxygen. Still other objects will appear hereinafter.

The above objects can be accomplished by practicing our invention which comprises adding to hydrocarbon materials a small proportion of a substance derived from the class of hydroxy- and amino-substituted phenyl ureas and thioureas. Our invention resides not in the determination that certain hydrocarbon materials can be treated to prevent oxidative deterioration, but rather in providing a class of compounds which has broad utility in providing such protection.

In general the compounds of our invention can be defined as those which contain the grouping

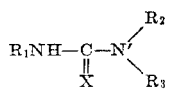

wherein $R_1$ is alkyl, aryl, or an aryl group substituted on the ring with an hydroxy, amino or alkylamino radical, $R_2$ is hydroxyphenyl or aminophenyl, $R_3$ is hydrogen, alkyl or aryl and $X$ is the oxygen or sulfur atom. Whenever in the further description of our invention hereinafter we refer to the term "alkyl," it is to be understood that we include straight chain, branched chain and cyclic saturated hydrocarbon radicals. As examples of straight chain saturated hydrocarbon radicals we include methyl, ethyl, n-propyl, n-hexyl, and n-octadecyl. As examples of branched chain saturated hydrocarbon radicals we include isopropyl, isobutyl, sec.-butyl, isoamyl and 2-methylhexyl. By cyclic saturated hydrocarbon radical we mean, for example, cyclopropyl, cyclobutyl, cyclopentyl, cyclohexyl, methylcyclohexyl and diethylcyclohexyl.

To further illustrate the nature of these protective substances the generalized formula

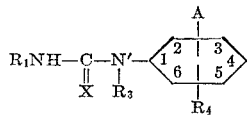

is presented to depict the substituted ureas and thioureas of our invention wherein $X$ stands for the oxygen or sulphur atom, $R_3$ and $R_4$ represent hydrogen or organic radicals further defined hereinafter, and A refers to the activating groups described hereinafter. In this generalized formula the numbers inserted in the phenyl radical are for the purpose of naming specific embodiments of our invention hereinafter. We have found that such compounds of our invention, wherein the activating group, A, of the phenyl radical is in the ortho or para position with respect to the $N'$-nitrogen atom, exhibit the greatest effectiveness and are preferred, although some activity is shown by the meta derivatives. The principal function of the groups $R_1$, $R_3$, and $R_4$ is believed to be to impart the proper balance of the properties of solubility, miscibility and compatibility to the antioxidant with the hydrocarbon substance which is to be protected. While the principal effect of these groups is as stated above, $R_1$ can be further chosen to intensify the action of the principal antioxidant forming groups, and in particular this intensifying action is obtained by choosing $R_1$ as a phenyl group substituted with one of the components A. In general the phenyl substituent, A, which we refer to as an activating group, comprises amino and hydroxy radicals and hydrocarbon derivatives thereof. Thus, we can illustrate the group A by hydroxy, amino, N-methylamino, N,N-dimethylamino, N,N-diethylamino, N,N-methylethylamino, N,N-ethylbutylamino, N,N-diisopropylamino, N-dodecylamino, N-cyclohexylamino, N,N-cyclohexylmethylamino, etc. Thus, examples of the hydroxyphenyl and aminophenyl groups of our invention which impart the distinctive anti-oxidant activity to our stabilizing compounds include p-hydroxyphenyl, o-hydroxyphenyl, m-hydroxyphenyl, 3 - methyl - 4 - hydroxyphenyl, 2-pentadecyl-4-hydroxyphenyl, p-aminophenyl, p-n-butylaminophenyl, p-dimethylaminophenyl, p-cyclohexylaminophenyl, p-methylethylaminophenyl and p-diethylaminophenyl.

Those substituents $R_1$, $R_3$ and $R_4$ which are chosen primarily to impart superior solubility properties to the compounds of our invention include alkyl, aryl, aralkyl, and alkaryl groups and substituted derivatives thereof. For example we have obtained good solubility characteristics and maintained the high antioxidant effectiveness of the compounds of our invention by various combinations of hydrogen, o-chlorophenyl, phenyl, naphthyl, tolyl, methyl, ethyl, n-propyl, isopropyl, n-butyl, amyl, pentadecyl, n-octadecyl, cyclohexyl, benzyl, p-ethoxyphenyl, p-methoxyphenyl, and $\beta$-hydroxyethyl groups on the N- and $N'$-nitrogen atoms or on the substituted phenyl radical characteristic of the compounds of our invention.

While we do not intend that our invention be limited by the choice of the groups $R_1$, $R_3$ and $R_4$, in the preferred embodiments of our invention these groups do not contain excessive amounts of certain atoms and radicals capable of offsetting the activating influence of the substituted phenyl radicals. For example, excessive amounts of halogen atoms or nitro groups are not preferred, although minor amounts can be tolerated.

The compounds of our invention may be further defined by reference to the following methods of preparation, which, while not restricting the scope of the variations possible in different embodiments of our invention, are representative of methods employed by us in preparing the specific materials described herein.

METHOD I

Unsymmetrical disubstituted ureas and thioureas of our invention have been prepared by reaction between substituted phenyl or alkyl isocyanates or isothiocyanates, and substituted anilines or alkylamines, one combination of which is represented by the equation

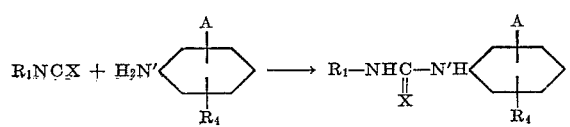

wherein the symbols have the same meaning as described hereinbefore. The reactants are mixed, in an appropriate solvent, at a temperature of about 50° C. and in a few hours the reaction product crystallizes and is recovered. By this method for example we have prepared the following compounds of our invention: N-(n - propyl) - N' - (p - hydroxyphenyl) urea, N-phenyl - N' - (p - hydroxyphenyl) thiourea, N-(n-octadecyl) - N' - (p-hydroxyphenyl) urea, N-(p-tolyl) - N' - (p-hydroxyphenyl) urea, N-phenyl-N' - (p - hydroxyphenyl) urea, N - phenyl-N'-(2-pentadecyl-4-hydroxyphenyl) -urea, N - phenyl-N'-(3-methyl-4-hydroxyphenyl) -urea, N,N'-diphenyl-N'-(p-hydroxyphenyl) urea, N - phenyl-N' - (p - dimethylaminophenyl) urea, N-phenyl-N'-(n-butyl) -N'-(p-hydroxyphenyl) urea, N-(p-ethoxyphenyl) - N' - (p-hydroxyphenyl) urea, n-(n-octadecyl) - N' - (p-dimethylaminophenyl) -urea, N-phenyl-N'-(o-hydroxyphenyl) urea, N-phenyl - N'-(p-dimethylaminophenyl) -thiourea, N - phenyl - N' - (m-hydroxyphenyl) urea, N-(β-naphthyl) - N' - (p - hydroxyphenyl) urea, N-(p-chlorophenyl) -N'- (p - hydroxyphenyl) urea, and N-octadecyl-N'-phenyl-N'-(p - hydroxyphenyl) - urea.

METHOD II

Symmetrical thioureas containing two of the characteristic activating groups of the compounds of our invention have been prepared by heating carbon disulfide and substituted anilines in the presence of elemental sulfur according to the equation

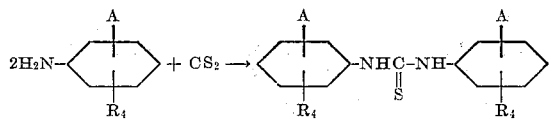

By this method we have prepared the following examples of the compounds of our invention: N,N'-bis(p-hydroxyphenyl)thiourea and N,N'-bis(p-dimethylaminophenyl) thiourea.

METHOD III

Certain symmetrical disubstituted ureas of our invention are prepared by warming an aqueous solution of the appropriate aniline hydrochloride with urea. This method is illustrated by the manufacture of N,N'-bis(p-hydroxyphenyl) urea.

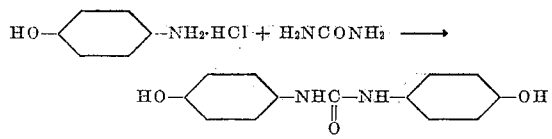

METHOD IV

We prepared certain N-alkylaminophenylureas of our invention by hydrogen reduction of nitroaromatic ureas in the presence of an aldehyde ammonia, the method of "reductive alkylation," according to the equation

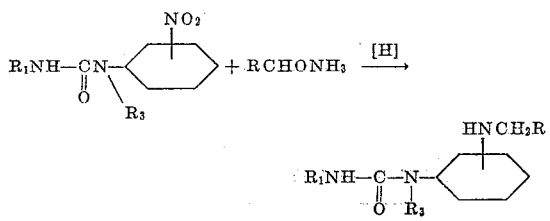

where R is an alkyl group. By this method we have prepared N-(p-hydroxyphenyl)-N'-(p-n-butylaminophenyl) urea, and N - (p - hydroxyphenyl) -N'-(p-isobutylaminophenyl) urea.

METHOD V

Symmetrical disubstituted ureas of our invention can be prepared by treating an aniline with phosgene, according to the equation

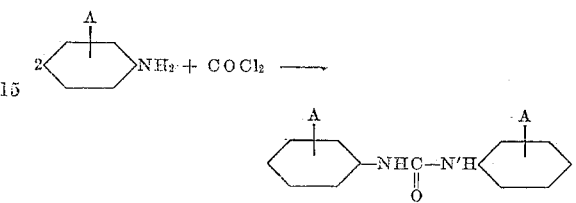

As an example of this method we have prepared N,N'-bis(p-hydroxyphenyl) urea thereby.

The absorption of oxygen by hydrocarbons can be measured directly by the standard method of the American Society of Testing Materials for determination of the oxidation stability of gasoline (induction period method), ASTM designation: D525-46, as fully described in part III-A, ASTM Standards for 1946. According to this method the induction period is the period during which there is no drop in pressure, indicating no absorption of oxygen when the test material is placed in a testing bomb maintained at a temperature of 100° C. with an initial pressure of 100 pounds per square inch gauge of oxygen. The induction period increase (IPI) is the increase in the duration of this period caused by the addition of a protective substance, and is a direct measure of the protection afforded by such additive. Thus, the longer the IPI the more effective is the stabilizer. On the contrary, certain substances exert a pro-oxidant effect in which a negative IPI is obtained, that is, the duration of the induction period, or period of no absorption of oxygen, is less than in the absence of the additive.

Our invention is illustrated by reference to Table I wherein are listed the IPI of a number of types of gasoline, as representative of the class of substances which can be protected by our compounds, determined by the above-described method. To obtain the results shown herein 6 milligrams of the additive was dissolved in 100 milliliters of the gasoline. Where the solubility characteristics of the additive were such that this concentration could not be obtained, a small amount of a solubilizing agent, such as ethyl alcohol, was added in amount up to 2 per cent of the gasoline.

It is well known in the art of protecting gasoline from oxidation that the susceptibility to oxidation of gasolines varies significantly with different types of gasolines. Furthermore, it is likewise well known that the efficiency of any antioxidant, and, therefore, the minimum concentration required, will vary greatly from gasoline to gasoline. Therefore, in order to show the general applicability of the compounds of our invention to the solution of this problem, and at the same time not present in detail the large amount of data so obtained, we have listed in Table I the average IPI obtained with from one to five test gasolines. The gasolines used in obtaining the data presented herein were all commercial blending stocks or finished gasolines and included the following types: An average-response gasoline containing 20 per cent olefins and 14 per cent aromatics, the remainder being paraffins and naphthenes; a gasoline containing approximately 38 per cent olefins, 33 per cent aromatics, and the remainder paraffins and naphthenes; a gasoline containing 18 per cent olefins and 24 per cent aromatics; a high-sulfur gasoline containing 0.21 per cent sulfur; and a gasoline containing 28 per cent olefins and 18 per cent aromatics with medium sulfur content.

The ASTM method employed to illustrate the activity of the compounds of our invention as in Table I is a reliable indication of the efficiency of a stabilizing material within the test limits of plus 10 minutes and minus 10 minutes. Therefore, a compound or substance which produces an induction period increase of greater than 10 minutes is an effective antioxidant, while a material which decreases the induction period by more than 10 minutes is a pro-oxidant. Materials exhibiting an effect within these limits are essentially inert. Thus, referring to Table I, it is readily apparent that compounds 2, 3, 5, 6, 10, 11, 12, 15 and 17, are strong antioxidants, and are typical examples of the hydroxyphenylureas of our invention containing but a single activating group and a diversity of the solubilizing groups. Still further examples of this embodiment of our invention which possess high activity include N - n - octadecyl - N' - p - hydroxyphenylurea, N - phenyl - N' - (2 - pentadecyl - 4 - hydroxyphenyl) -urea, N-α-naphthyl- and N-β-naphthyl-N' - p - hydroxyphenylurea, N - phenyl - N' - n - octadecyl - N' - p - hydroxyphenylurea, and N,N' - diphenyl - N' - p - hydroxyphenylurea. Typifying the activity of the hydroxyphenylthioureas of our invention is the compound numbered 4, containing the single hydroxy activating group. A further example of this embodiment is N - o - tolyl - N' - (2 - methyl - 4 - hydroxyphenyl) - thiourea. Compounds 7, 16, 18 and 19 illustrate the aminophenyl- and alkylaminophenylureas and thioureas of our invention in which only solubilizing groups are present in addition to the activating group. In addition, N - phenyl - N' - p - diethylaminophenylurea is a strong antioxidant and a representative of this class. The compounds of our invention in Table I numbered 8, 13 and 14 represent those containing two identical substituted phenyl activating groups. In general, such embodiments include the N,N'-bis(hydroxyphenyl)-, N,N'-bis(aminophenyl)-, N,N' - bis(alkylaminophenyl)-, and N,N' - bis(dialkylaminophenyl) - ureas and thioureas. Compound No. 1 in the table shows the extremely high antioxidant effectiveness obtained by combining two different substituted phenyl groups on the ureas and thioureas of our invention. Further examples of such an embodiment include compounds No. 9 and 20 as well as, for example, N-p-aminophenyl-N'-p-hydroxyphenylurea and N-p-isobutylaminophenyl-N'-p-hydroxyphenylurea.

Illustrative of the specificity of the above-described activating substituted phenyl groups of the preferred embodiment of our invention, Table I also lists the results obtained when the parent compounds urea and thiourea were tested by this method (Nos. 21 and 24). These materials are essentially inert as antioxidants. Likewise, incorporating N,N'-phenyl and -alkyl groups unsubstituted with hydroxy or amino groups does not impart antioxidant properties to urea and thiourea, as exemplified by Nos. 27, 29, 32 and 34. Such compounds range between inert materials and strong pro-oxidants. Further examples of such compounds which we have found not to be antioxidants include N,N'-dimethylurea, N-phenyl - N' - methylthiourea, and N,N' - di - n - butyl thiourea. Furthermore, substitution of the phenyl radical of phenyl-ureas and -thioureas with other groups than the activating groups of our invention does not produce an antioxidant material. For example the nitro group of No. 26 imparts no activity. Still further examples of substituted phenyl-ureas and thioureas which are not antioxidants include N-phenyl-N'-(3,5-dichlorophenyl) -urea and N-phenyl-N-methyl-N'- (3,5-dichlorophenyl) -urea. Further, we prefer that the compounds of our invention contain a single activating group on each phenyl radical.

To illustrate that there must be one and only one hydrogen atom on the N-atom of our generalized formula of our compounds, the N,N'-tetra substituted ureas and thioureas are pro-oxidants as shown in Table I, Nos. 25 and 35. The latter compound particularly shows the importance of this —NH— grouping, for in this compound two of the p-hydroxyphenyl groups are also present. The lack of antioxidant effectiveness of ureas and thioureas containing the grouping —NH₂ is illustrated by entries 28 and 33 in Table I, even though a p-hydroxylphenyl group is present in No. 28.

The above contrast in results clearly draws the distinction between so-called metal deactivators and the true antioxidants. Many disclosures have been made to these and similar compounds, that is ureas and thioureas not containing the hydroxyphenyl or aminophenyl, or those containing a free —NH₂ group, as metal deactivators, wherein the antioxidant-destroying power of trace amounts of certain metals is nullified, permitting a true antioxidant to function. However, in the absence of such metals and in the absence of true antioxidants such materials afford no protection to hydrocarbons.

Table I

EFFECT ON INDUCTION PERIOD INCREASE OF GASOLINES

| No. | Substance | IPI, min. |
|---|---|---|
| 1 | N-p-Hydroxyphenyl-N'-(p-n-butylaminophenyl)-urea. | 540 |
| 2 | N-Benzyl-N'-p-hydroxyphenylurea | 390 |
| 3 | N-n-Propyl-N'-p-hydroxyphenylurea | 350 |
| 4 | N-Phenyl-N'-p-hydroxyphenylthiourea | 280 |
| 5 | N-Phenyl-N'-p-hydroxyphenylurea | 275 |
| 6 | N-Phenyl-N'-(3-methyl-4-hydroxyphenyl)-urea | 255 |
| 7 | N-Phenyl-N'-p-dimethylaminophenylurea | 235 |
| 8 | N,N'-Bis(p-hydroxyphenyl)thiourea | 220 |
| 9 | N-p-Ethoxyphenyl-N'-p-hydroxyphenylurea | 190 |
| 10 | N-Phenyl-N'-o-hydroxyphenylurea | 180 |
| 11 | N-o-Chlorophenyl-N'-p-hydroxyphenylurea | 175 |
| 12 | N-p-Tolyl-N'-p-hydroxyphenylurea | 170 |
| 13 | N,N'-Bis(p-hydroxyphenyl)urea | 140 |
| 14 | N,N'-Bis(p-dimethylaminophenyl) thiourea | 130 |
| 15 | N-Phenyl-N'-n-butyl-N'-p-hydroxyphenylurea | 100 |
| 16 | N-n-Octadecyl-N'-p-dimethylaminophenylurea | 80 |
| 17 | N-Phenyl-N'-m-hydroxyphenylurea | 75 |
| 18 | N-Phenyl-N'-p-aminophenylurea | 65 |
| 19 | N-Phenyl-N'-p-dimethylaminophenylthiourea | 65 |
| 20 | N-p-Ethoxyphenyl-N'-p-dimethylaminophenylurea. | 60 |
| 21 | Thiourea | 10 |
| 22 | N-β-Hydroxyethylurea | 10 |
| 23 | N-Allyl thiourea | 10 |
| 24 | Urea | 0 |
| 25 | N,N'-Dimenthyl-N,N'-diphenylurea | 0 |
| 26 | N-Phenyl-N'-p-nitrophenylurea | −10 |
| 27 | N,N'-Diethylurea | −10 |
| 28 | N-(n-Butyl)-N-(p-hydroxyphenyl)urea | −35 |
| 29 | N,N'-Diethylthiourea | −50 |
| 30 | N-Phenylthiourea | −25 |
| 31 | N-Phenylurea | −50 |
| 32 | N,N-Bis(isopropyl)thiourea | −50 |
| 33 | N,N-Bis(phenyl)thiourea | −50 |
| 34 | N,N'-Bis(phenyl)thiourea | −70 |
| 35 | N,N'-Dimethyl-N,N'-bis(p-hydroxyphenyl)thiourea. | −70 |
| 36 | N,N'-Bis(amyl) thiourea | −85 |

We have demonstrated the efficiency of the compounds of our invention in preventing undue formation of gum in automotive gasolines by storing such a gasoline for long periods in the presence and absence of our antioxidants and determining from time to time the gum content of the fuel. A commercial motor gasoline consisting of 50 per cent straight-run and 50 per cent thermally-cracked gasoline initially containing 2.5 milligrams of gum per 100 milliliters was employed. For each demonstration duplicate amber quart bottles were filled with one pint of the gasoline and sufficient additive was dissolved therein to be equivalent to 4.5 milligrams of stabilizer per 100 milliliters of gasoline. The bottles were stoppered and stored in the dark at a temperture of 110° F. Every four weeks the bottles and their contents were cooled to room temperature and the stoppers were removed for two hours to permit access to the air. Every 8 weeks a sample of the fuel mixture was removed and the dissolved gum therein was determined by the "air-jet evaporation" method, ASTM designation: D381-46, fully described in ASTM Standards for 1946, Part III-A. In the same manner the gum formed in the fuel under these conditions, but in the absence of the antioxidants of our invention, was determined by storing, aerating and sampling the untreated fuel as above. From Table II it is readily apparent that the amount of gum formed in the presence of our stabilizing materials was insignificant, and, furthermore, that this protection was afforded to a sensitive fuel, under conditions whereby very large quantities of gum were formed in the untreated fuel.

*Table II*

EFFECT ON GUM IN MOTOR GASOLINE

| No. | Substance | Increase in gum content, mg./100 ml. | | | |
|---|---|---|---|---|---|
| | | 8 Weeks | 16 Weeks | 24 Weeks | 32 Weeks |
| 1 | None | 2.5 | 15 | 107 | 406 |
| 2 | N-Phenyl-N'-p-hydroxy-phenyl-thiourea | 0 | 3 | 5 | 8 |
| 3 | N-Phenyl-N'-p-hydroxy-phenyl-urea | 0 | 0 | 0 | 2.5 |

To illustrate the protection afforded to hydrocarbon solutions of tetraethyllead by the compounds of our invention we conducted a series of tests in which hot-acid isooctane, carefully distilled from glass equipment, and containing 4.6 milliliters of tetraethyllead per gallon, was heated at a temperature of 100° C. in a stainless steel bomb with oxygen added to an initial pressure of 100 pounds per square inch gauge. Under these conditions the pressure in a bomb containing only isooctane and a tetraethyllead antiknock mixture underwent a sharp drop after four hours, indicating absorption of oxygen by the fuel mixture. The minimum concentration of each of several additives required to prevent a drop in pressure in a bomb during a period of 16 hours at a temperature of 100° C. was thereupon determined. Thus, the effective concentration shown in Table III is the quantity of additive required, expressed as milligrams per 100 milliliters of fuel, to afford a greater than four-fold increase in the stability of the fuel.

*Table III*

STABILIZATION OF ISOOCTANE CONTAINING TETRAETHYLLEAD

| No. | Additive | Effective conc. mg./100 ml. |
|---|---|---|
| 1 | N'-(p-hydroxyphenyl)-N-phenylurea | 0.2 |
| 2 | N-Phenyl-N'-(p-hydroxyphenyl)thiourea | 0.4 |
| 3 | N-n-Butyl-p-aminophenol | 1.5 |
| 4 | sym.-Diphenylurea | >2.3 |
| 5 | Ethylenethiourea | >2.3 |

By reference to Table III the low effective concentration to produce a more than four-fold increase in the stability of the fuel of the compounds of our invention is immediately apparent. Comparing Nos. 1 and 2, representative of the compounds of our invention, with No. 3, a commercial material widely used to stabilize gasolines, our compounds are from three and one-half, to seven and one-half times as effective. By further comparing Nos. 1 and 2 with Nos. 4 and 5 the effectiveness of the activating groups characteristic of the compounds of our invention is further illustrated. Compounds 4 and 5 failed to protect the fuel mixture when added in amounts of six to eleven times the effective concentrations of representative compounds of our invention.

The quantities of the compounds of our invention incorporated in the materials to be stabilized are not critical and depend largely upon the type of material being stabilized and the conditions under which the exposure to oxygen occurs. For example, with gasolines, diesel fuels, heating oils, gasoline tetraethyllead mixtures, mineral oils, lubricants, hydrocarbon solvents and chemical intermediates, and similar materials the compounds of our invention are preferably employed in concentrations between the limits of approximately 0.1 and 15 milligrams per 100 milliliters of material to be stabilized. For other materials somewhat larger amounts of the stabilizers of our invention are preferred and can be tolerated. Thus, in such materials we employ between approximately 0.1 and 2 parts of antioxidant per 100 parts of oxidizable material. Thus, our compounds can be satisfactorily employed in a wide range of concentrations, and we do not intend that our invention be restricted to the specific quantities mentioned herein.

We have disclosed a number of preferred embodiments of our invention and illustrated several means whereby protection can be afforded to hydrocarbons sensitive to attack by oxygen. Our invention is not intended to be limited to the specific embodiments of our invention herein or to the means described herein for obtaining the advantages possible in employing our compounds, as other methods of practicing our invent will be apparent to those skilled in the art.

We claim:

1. A petroleum hydrocarbon olefin-containing fuel, for use in internal combustion engines, stable to oxidation, consisting essentially of a petroleum hydrocarbon fuel composition, normally tending to deteriorate in the presence of oxygen and, in quantity sufficient to inhibit such deterioration, an antioxidant ingredient having the general formula

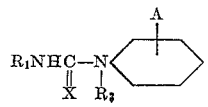

wherein $R_1$ is selected from the group consisting of alkyl containing from 1 to 18 carbon atoms inclusive, aryl hydrocarbon, hydroxyphenyl, aminophenyl, and lower alkylaminophenyl, $R_3$ is selected from the group consisting of hydrogen, alkyl containing from 1 to 18 carbon atoms inclusive, and aryl, A is selected from the group consisting of hydroxy, amino, and lower alkylamino, and X is selected from the group consisting of oxygen and sulfur.

2. The petroleum hydrocarbon fuel of claim 1 wherein the antioxidant ingredient is a thiourea.

3. The petroleum hydrocarbon fuel of claim 1 wherein the antioxidant ingredient is a urea.

4. The petroleum hydrocarbon fuel of claim 1 wherein A is a p-hydroxy group.

5. The petroleum hydrocarbon fuel of claim 4 wherein the antioxidant ingredient is a urea.

6. The petroleum hydrocarbon fuel of claim 1 wherein A is a p-amino group.

7. The petroleum hydrocarbon composition of claim 6 wherein the antioxidant ingredient is a urea.

8. The petroleum hydrocarbon composition of claim 6 wherein the antioxidant ingredient is a thiourea.

9. The composition of claim 1 wherein the antioxidant ingredient is N-p-hydroxyphenyl-N'-(p-n-butylaminophenyl) urea.

10. The composition of claim 1 wherein the antioxidant ingredient is N-phenyl-N'-p-hydroxyphenylthiourea.

11. The composition of claim 1 wherein the antioxidant ingredient is N,N'-bis(p-hydroxyphenyl) urea.

12. The composition of claim 1 wherein the antioxidant ingredient is N,N'-bis(p-dimethylaminophenyl) thiourea.

13. The composition of claim 1 wherein the antioxidant ingredient is N-phenyl-N'-p-aminophenylurea.

14. The petroleum hydrocarbon composition of claim 1 wherein A is a p-alkylamino group.

15. The petroleum hydrocarbon composition of claim 14 wherein the antioxidant ingredient is a thiourea.

References Cited in the file of this patent

UNITED STATES PATENTS

| Number | Name | Date |
|---|---|---|
| 2,266,601 | Howland | Dec. 16, 1941 |
| 2,302,552 | Johnson | Nov. 17, 1942 |
| 2,373,049 | Pedersen | Apr. 3, 1945 |
| 2,396,156 | Clarkson | Mar. 5, 1946 |
| 2,477,872 | Haury | Aug. 2, 1949 |
| 2,657,984 | Braithwaite et al. | Nov. 3, 1953 |

OTHER REFERENCES

Beilstein, 4th ed. (1930), vol. 13, page 101.